(12) United States Patent
Lien et al.

(10) Patent No.: US 7,493,010 B1
(45) Date of Patent: Feb. 17, 2009

(54) STEPPED LIGHT GUIDE

(75) Inventors: Yen-Po Lien, Kaohsiung (TW);
Hung-Wen Chang, Kaohsiung (TW)

(73) Assignee: Emerging Display Technologies Co., Ltd., Kaohsiung (TW)

( * ) Notice: Subject to any disclaimer, the term of this patent is extended or adjusted under 35 U.S.C. 154(b) by 0 days.

(21) Appl. No.: 12/077,683

(22) Filed: Mar. 20, 2008

(51) Int. Cl.
*G02B 6/10* (2006.01)

(52) U.S. Cl. ...................................... 385/146; 385/129

(58) Field of Classification Search ......... 385/129–132, 385/146, 147; 349/64, 65, 70, 112, 113; 362/31, 330, 341, 342, 355, 551, 558, 615–628
See application file for complete search history.

(56) References Cited

U.S. PATENT DOCUMENTS

| | | | |
|---|---|---|---|
| 5,093,765 A | 3/1992 | Kashima et al. | |
| 5,341,231 A | 8/1994 | Yamamoto et al. | |
| 5,587,816 A | 12/1996 | Gunjima et al. | |
| 5,982,540 A | 11/1999 | Koike et al. | |
| 6,099,134 A | 8/2000 | Taniguchi et al. | |
| 6,231,200 B1 | 5/2001 | Shinohara et al. | |
| 6,328,453 B1 | 12/2001 | Ohkawa | |
| 6,454,452 B1 | 9/2002 | Sasagawa et al. | |
| 6,729,737 B2 | 5/2004 | Jeon et al. | |
| 6,752,507 B2 | 6/2004 | Wang et al. | |
| 7,327,929 B2 * | 2/2008 | Chien et al. | 385/146 |

FOREIGN PATENT DOCUMENTS

| | | |
|---|---|---|
| TW | 428765 | 4/2001 |
| TW | 430748 | 4/2001 |
| TW | 452088 | 8/2001 |

* cited by examiner

*Primary Examiner*—Kevin S Wood
(74) *Attorney, Agent, or Firm*—C. G. Mersereau; Nikolai & Mersereau, P.A.

(57) ABSTRACT

A stepped light guide has an incident surface, an emitting surface and a stepped reflecting structure. The emitting surface is adjacent to the incident surface. The stepped reflecting structure is adjacent to the incident surface, faces the emitting surface and has a proximal end, a distal end, multiple planar surfaces and multiple inclined surfaces. The proximal end is adjacent to the incident surface. The distal end is opposite to the proximal end. The planar surfaces are parallel to and separated from the emitting surface by a depth, the depth being gradually reduced from the proximal end to the distal end. The inclined surfaces are formed between every two adjacent planar surfaces. The light guide effectively changes a linear or point light source into a surface light source having uniform illumination.

4 Claims, 3 Drawing Sheets

STEPPED LIGHT GUIDE

BACKGROUND OF THE INVENTION

1. Field of the Invention

The present invention relates to a light guide, especially to a stepped light guide to diffuse light generated from a side light source to produce even lighting.

2. Description of the Related Art

A conventional light guide is utilized with linear light sources or at least one point light source to diffuse emitted light as a uniform surface light source. A conventional light guide may be rectangular-shaped or wedge-shaped and has an incident surface, an emitting surface and a reflective surface. The incident surface allows photons from a light source to enter. The emitting surface is adjacent to the incident surface transmits photons out of the light guide. The reflective surface is opposite to the emitting surface and adjacent to the incident surface and has a geometric structure. The geometric structure guides photons from the incident surface toward the emitting surface. Various patents, including U.S. Pat. No. 5,341,231, U.S. Pat. No. 6,328,453, U.S. Pat. No. 6,729,737, U.S. Pat. No. 6,752,507, Taiwan Patent No. 452088 and Taiwan Patent No. 428765, are related to changes in surface composition or geometric structure, and may comprise multiple reflectors implemented as V-cut grooves, annular protrusions, dots or the like.

However, light intensity over the emitting surface is inconsistent, a problem related to mainly patents, including, U.S. Pat. No. 6,099,134 disclosing a back lighting unit including a light guide provided with a random dot disposition pattern so that luminance of the backlighting unit is uniform over the surface thereof.

In U.S. Pat. No. 5,093,765, one major surface of a light guide is partially covered with a light diffusing material under specified conditions having a higher refractive index than the light guide.

As outlined above, conventional light guides produce a consistent light intensity by using complicated microstructures, such as dot patterns, protrusions or grooves to guide photons toward the emitting surface. The conventional light guide may be further combined with optical films, like reflectors, a diffuser or a prism sheet to improve illumination of the surface light source.

It is desired to provide a light guide that has a simple structure and can effectively diffuse light generated from a side light source to produce even lighting without depending on other optical films.

SUMMARY OF THE INVENTION

The main objective of the present invention is to provide a stepped light guide being able to diffuse light generated from a side light source to produce even lighting.

To achieve the forgoing objective, the stepped light guide in accordance with the present invention comprises an incident surface, an emitting surface and a stepped reflecting structure. The emitting surface is adjacent to the incident surface. The stepped reflecting structure is adjacent to the incident surface, faces the emitting surface and has a proximal end, a distal end, multiple planar surfaces and multiple inclined surfaces. The proximal end is adjacent to the incident surface. The distal end is opposite to the proximal end. The planar surfaces are parallel to and separated from the emitting surface by a depth, the depth being gradually reduced from the proximal end to the distal end. The inclined surfaces are formed between every two adjacent planar surfaces. The light guide effectively changes a linear or point light source into a surface light source having uniform illumination.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
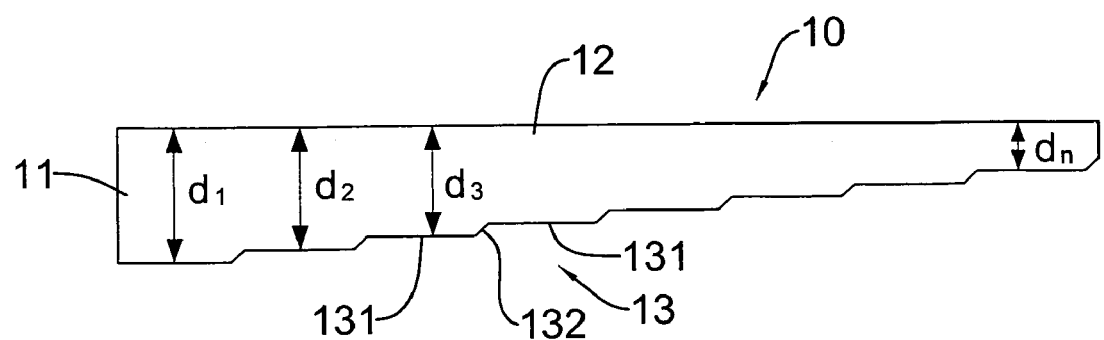
FIG. 1 is a side view in cross section of a first embodiment of a stepped light guide in accordance with the present invention.
Figure 2:
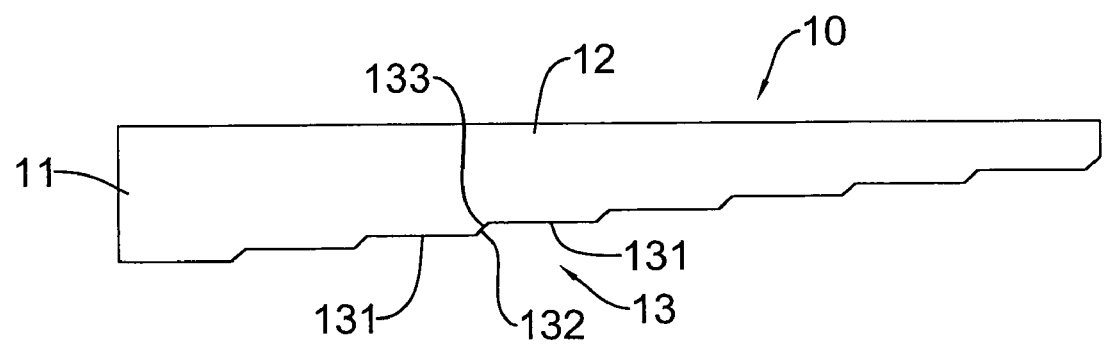
FIG. 2 is a side view in cross section of a second embodiment of a stepped light guide in accordance with the present invention.

With reference to FIGS. 1 to 2, a stepped light guide (10) in accordance with the present invention comprises an incident surface (11), an emitting surface (12) and a stepped reflecting surface (13).

The incident surface (11) is mounted adjacent to a light source to allow photons to be emitted into the light guide (10).

The emitting surface (12) is adjacent to the incident surface (11) and transmits the photons out of the light guide (10).

The stepped reflecting structure (13) is adjacent to the incident surface (11), faces the emitting surface (12), reflects the photons towards the emitting surface (12) and has a proximal end, a distal end, multiple planar surfaces (131), multiple inclined surfaces (132) and an optional reflective coating (133). The proximal end is adjacent to the incident surface (11). The distal end is opposite to the proximal end. Each planar surface (131) is parallel to and separated from the emitting surface (12) by a depth ($d_1$, $d_2$, $d_3$, $d_n$). The depths ($d_1$, $d_2$, $d_3$, $d_n$) are gradually reduced from the proximal end to the distal end. The inclined surfaces (132) are formed between every two adjacent planar surfaces (131) and each inclined surface (132) may have a width. The inclined surface (132) may be inclined-relative to the planar surface (131) at an angle between 40 to 50 degrees. The width is a distance separating two adjacent planar surfaces (131) and the width may be between 0.5 to 10 μm. The reflective coating (133) is formed on the inclined surfaces (132).

Figure 3:
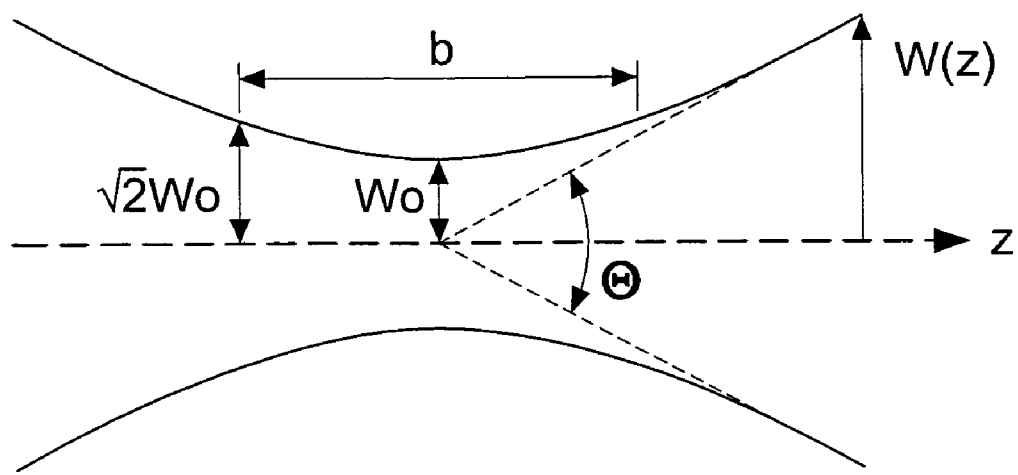
FIG. 3 is a schematic view of Gaussian beam propagation.
Figure 4:
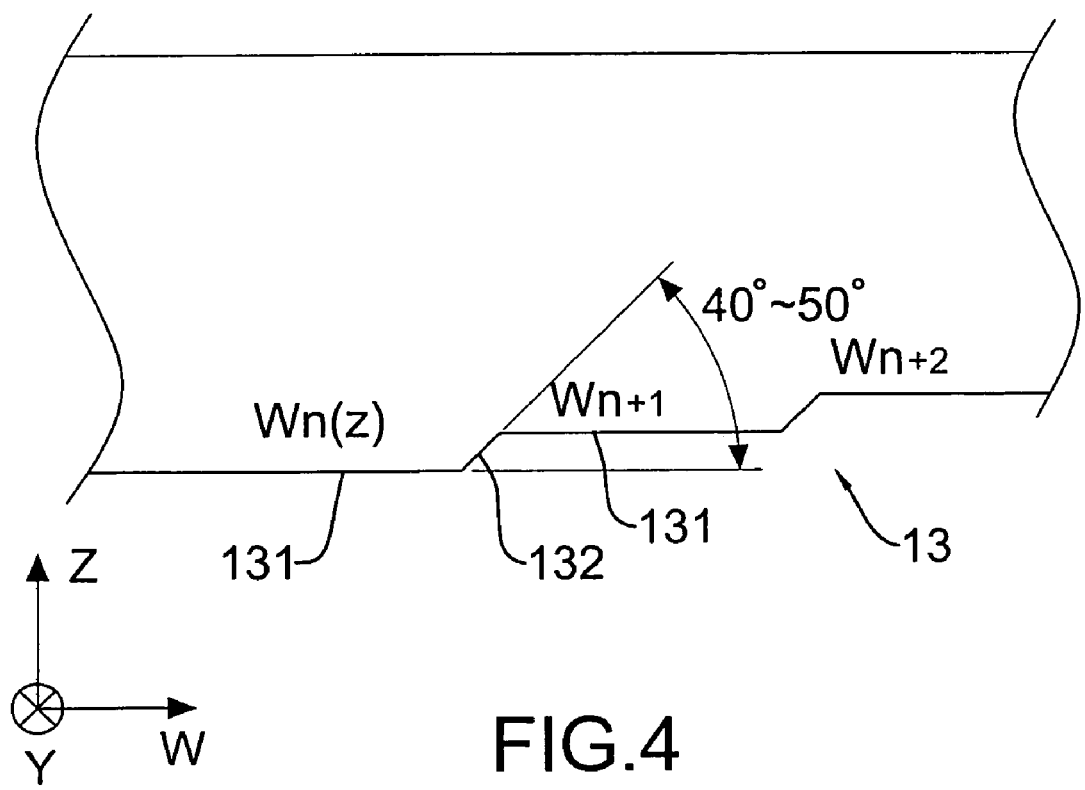
FIG. 4 is a geometric scheme of a Z-W dimensions in the partial side view of the stepped light guide in FIG. 1.

In practical use, the stepped light guide (10) has a total width (w) and a thickness (z). The width (w) is usually above twenty times the thickness (z). The thickness (z) decreases from a value z0 to zero. Therefore the thickness (z) has an average value ($z_{ave}$) around $z_0/2$. Thus the total width (w) is above 40 $z_{ave}$. With further reference to FIGS. 3 and 4, for a Gaussian beam propagating in free space, the beam width w(z) will be at a minimum value $w_0$ at one place along the beam axis, known as the beam waist. For a beam of wavelength λ at a distance z along the beam from the beam waist, the variation of the beam width is given by $$w(z) = w_0 \sqrt{1 + \left(\frac{z}{z_0}\right)^2}$$

where the origin of the z-axis is defined, without loss of generality, to coincide with the beam waist, and where $$z_0 = \frac{\pi w_0^2}{\lambda}$$

is called the Rayleigh range. Therefore $$w(z) = w_0 \sqrt{1 + \left(\frac{z}{z_0}\right)^2} \approx \frac{\lambda z}{\pi w_0}.$$

Since $$\Theta \to 2w(z)/z, \quad \Theta = \frac{2\lambda}{\pi w_0} = 0.637 \frac{\lambda}{w_0},$$

take a wavelength of 0.546 μm of a visible light as the value of λ, therefore when the total width (w) is above 40 $z_{ave}$ $$\to w(z) \geq 40z = \frac{\lambda z}{\pi w_0} = \frac{0.546 * z}{\pi w_0}$$

$$\to w_0 \leq \frac{0.546}{40\pi} \text{ mm} = 4.3 \text{ μm}$$

→$2w_0 \leq 8.6$ μm→the width of each inclined surface (132)

According to the foregoing equations, as the stepped light guide (10) has a total width (w) above forty times the average value of the thickness (z) of the stepped light guide (10), the width of each inclined surface (132) may have a practical value not more than 8.6 μm.

The stepped light guide (10) discloses a geometric shape not like a rectangle, a wedge or an arc, but a new stair stepped shape. The present invention applies the theory of micro machining to make the light guide (10) perform a total reflection on the stepped reflecting structure (13) to reflect photons from incident surface (11) to the emitting surface (12).

When using the stepped light guide (10) in a back light module, a linear back light source (such as a Cold Cathode Fluorescent Lamp) is placed beside the incident surface (11) of the stepped light guide (10) and emits photons through the incident surface (11) substantially perpendicularly to the emitting surface (12). The photons are reflected by the inclined surfaces (132) toward the emitting surface (12) and out from the emitting surface (12).

Figure 5:
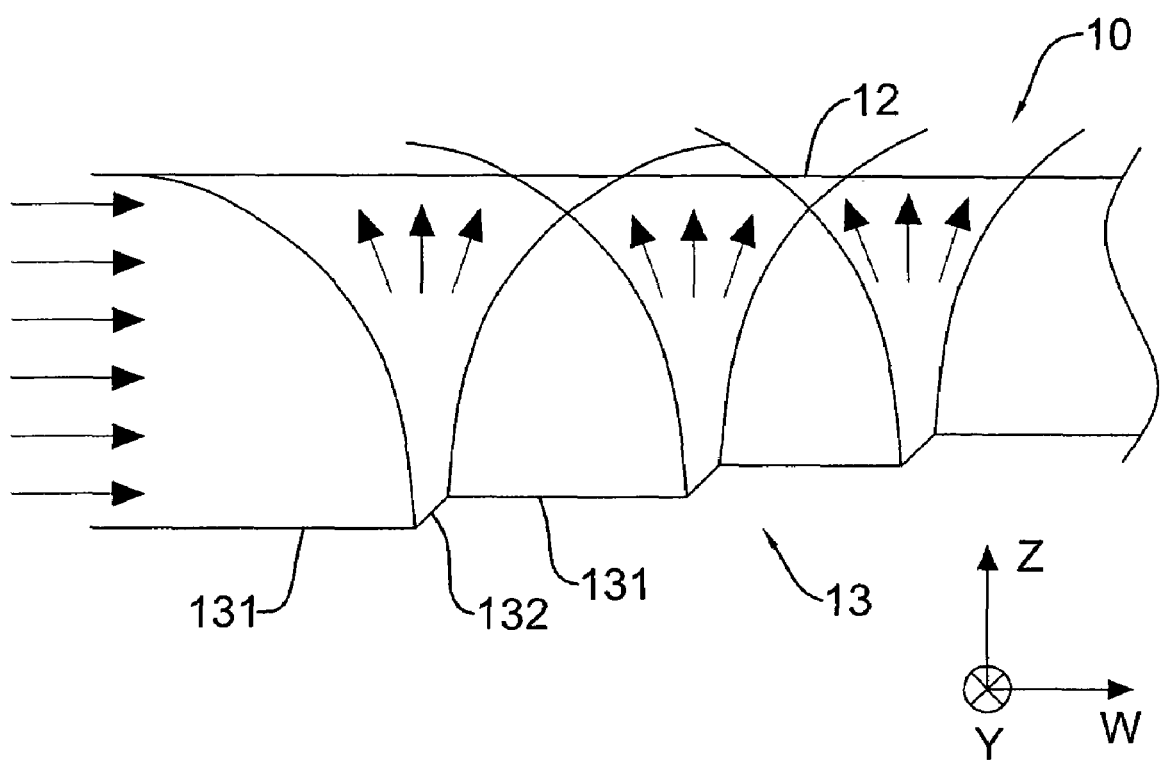
FIG. 5 is an operational side view of the stepped light guide in FIG. 1 shown with photons being reflected.

Moreover, the configuration of stepped reflecting structure (13) in accordance with the present invention is obtained via calculations and experiences of Wave Optics to perform uniform illumination. With further reference to FIG. 5, when incident photons horizontally enter the stepped light guide (10), edge diffractions of two corner arises and reflecting photons of Gaussian beam occur between two planar surfaces next to each other. As the area of the inclined surface (132) getting bigger, the effect of the Gaussian beam will be greater and oppositely the effect of the Edge diffraction will be smaller. The Edge diffractions of two corner arises are cylindrical waves and each two edge diffractions have an overlap (A) which is assistant for uniformly illuminating.

TracePro, by Lambda research, a general ray-tracing program for optical analysis, was used to simulate photons in the stepped light guide (10). When incident photons horizontally enter the stepped light guide (10), all the photons are reflected in a positive direction toward the emitting surface (12), and no photons are reflected in a negative direction, opposite to the positive direction. Therefore, a reflector under the stepped light guide (10) is not required to reflect photons originally reflected in the negative direction back. Therefore the material costs are reduced and the light guide (10) is simplified.

According to the foregoing description, the stepped light guide (10) can effectively turn a side light source to a uniform surface light source without having a complicated design structure (such as dot patterns, protrusions or V-CUT grooves) or depending on other optical films (such as reflectors, diffusion films, brightness enhancement films, and the like). Therefore, the present invention provides a stepped light guide (10) having low material costs and a simple geometrical structure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stepped light guide comprising:
   an incident surface;
   an emitting surface being adjacent to the incident surface; and
   a stepped reflecting structure being adjacent to the incident surface, facing the emitting surface and having
      a proximal end being adjacent to the incident surface;
      a distal end being opposite to the proximal end;
      multiple planar surfaces being parallel to and separated from the emitting surface by a depth, the depths being gradually reduced from the proximal end to the distal end; and
      multiple inclined surfaces being formed between every two adjacent planar surfaces, each inclined surface having two edges respectively connecting to an edge of an adjacent planar surface wherein the edge of the inclined surface is coplanar with the corresponding planar surface.

2. The stepped light guide as claimed in claim 1, wherein each inclined surface is inclined relative to the planar surface at an angle between 40 to 50 degrees.

3. The stepped light guide as claimed in claim 2, wherein each inclined surface has a width being a distance separating two adjacent planar surfaces, and the width being between 0.5 to 10 μm.

4. The stepped light guide as claimed in claim 1, wherein the stepped reflecting structure further has a reflective coating being formed on the inclined surfaces.

* * * * *